Figure 1:
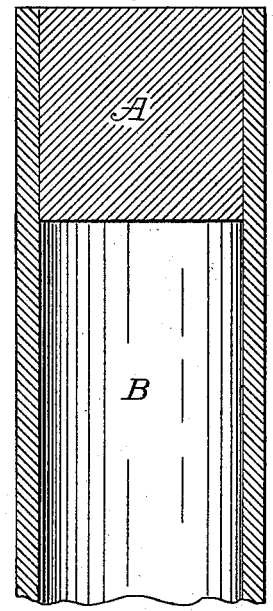

(No Model.)

A. BALL.
PROSPECTING OR WELL BORING TUBE.

No. 316,865. Patented Apr. 28, 1885.

WITNESSES
M E Fowler
John C Schroeder

INVENTOR
Albert Ball
PER Geo W Dyer
ATTORNEY

N. PETERS. Photo-Lithographer, Washington, D. C.

UNITED STATES PATENT OFFICE.

ALBERT BALL, OF CLAREMONT, NEW HAMPSHIRE, ASSIGNOR TO THE SULLIVAN MACHINE COMPANY, OF SAME PLACE.

PROSPECTING OR WELL-BORING TUBE.

SPECIFICATION forming part of Letters Patent No. 316,865, dated April 28, 1885.

Application filed December 19, 1884. (No model.)

*To all whom it may concern:*

Be it known that I, ALBERT BALL, of Claremont, in the county of Sullivan and State of New Hampshire, have invented a new and useful Improvement in Prospecting or Well-Boring Tubes; and I do hereby declare that the following is a full and exact description of the same, reference being had to the accompanying drawings, and to the letters of reference marked thereon.

The object I have in view in the present application is an improvement in coupling together tubes, (for prospecting or well-boring or other similar uses,) whereby the places of connection are thickened and strengthened and made more rigid without materially increasing the weight or the external size of the tubes.

My invention consists, first, in making this connection in the end of the pipe, ready to receive the coupling, and, secondly, in making the connection in one end of the pipe a strengthened addition to the pipe and coupling combined. These results I accomplish by welding in at the ends of the pipes pieces of iron or steel, and then boring them out to the desired size, and threading them internally to receive the coupling in the first case, and in the second case threading the projecting end externally, ready to be screwed into the pipe. It is obvious that instead of welding in solid plugs of metal, as shown in the drawings, a tubular plug can be substituted; but, while not intending to confine my claims to the former, I have found the latter method practically less economical and successful in actual use.

For the better comprehension of my invention, in connection with the description, attention is invited to the accompanying drawings.

Figure 2:
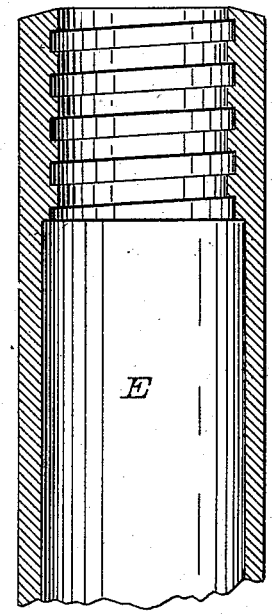
Figure 3:
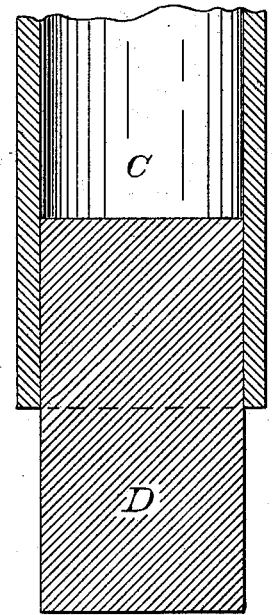
Figure 4:
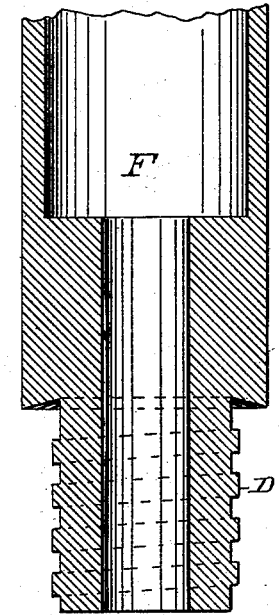

Figure 1 shows a section (vertical) of the end of a pipe wherein the plug A is placed, ready to be welded; and Fig. 2 shows the same after it has been welded and bored and threaded, ready to receive the male coupling. Fig. 3 shows a vertical section of the end of a pipe wherein the plug D has been placed, ready to weld, so as to stiffen the pipe and form a male coupling; and Fig. 4 shows the same after it has been bored and the projection turned and threaded (externally) so as to make a male coupling.

The advantages of my method are very great, as the coupling-joint, which is usually the weakest part of the pipe, (the screw-thread usually being cut directly into the wall of the pipe,) is by my device made the strongest part, and I am thereby enabled to use much lighter pipe to accomplish as much as heretofore by a heavier pipe. In deep boring the weight is an important consideration, as well as the cost and endurance of the pipe.

What I claim as my invention, and desire to secure by Letters Patent, is—

1. The female part of a coupling-joint at the end of a tube or pipe, made by welding in a metal plug and screw-threading the same internally, substantially as described.

2. The male part of a coupling-joint at the end of a tube or pipe, made by welding in a metal plug, boring the same centrally, and screw-threading its projecting end externally, substantially as described.

3. The male or female part of a coupling-joint at the end of a tube or pipe, made by welding in a tubular plug and screw-threading it, substantially as described.

In testimony whereof I affix my signature in presence of two witnesses.

ALBERT BALL.

Witnesses:
FRANK A. BALL,
JOHN R. SHAW.